(12) United States Patent
Fang et al.

(10) Patent No.: US 8,268,126 B2
(45) Date of Patent: Sep. 18, 2012

(54) METHOD, EQUIPMENT AND APPLICATIONS FOR FAST COMPLETE DISSOLUTION AND HYDROLYSIS OF LIGNOCELLULOSIC BIOMASS

(76) Inventors: Zhen Fang, Kunming (CN); Chun Fang, Prosser, WA (US)

( * ) Notice: Subject to any disclaimer, the term of this patent is extended or adjusted under 35 U.S.C. 154(b) by 100 days.

(21) Appl. No.: 12/671,510

(22) PCT Filed: Mar. 28, 2008

(86) PCT No.: PCT/CN2008/000623
§ 371 (c)(1),
(2), (4) Date: Jan. 20, 2010

(87) PCT Pub. No.: WO2009/018709
PCT Pub. Date: Feb. 12, 2009

(65) Prior Publication Data
US 2010/0270499 A1  Oct. 28, 2010

(30) Foreign Application Priority Data
Aug. 3, 2007 (CN) .......................... 2007 1 0141265

(51) Int. Cl.
D21C 3/02 (2006.01)
C10G 1/00 (2006.01)
(52) U.S. Cl. .......................................... 162/90; 208/400
(58) Field of Classification Search .................... 162/90; 208/405
See application file for complete search history.

(56) References Cited

U.S. PATENT DOCUMENTS 6,576,084 B1 * 6/2003 Stromberg et al. ............. 162/19

FOREIGN PATENT DOCUMENTS

WO   WO 0015668 A1 * 3/2000

OTHER PUBLICATIONS

Elliot et al., Product Analysis from Direct Liquefaction of Several High-Moisture Biomass Feedstocks, 1988, pubs.acs.org, chapter 17.*
Fang et al.,of Liquefaction and Gasification of Cellulose with Na2CO3 and Ni in Subcritical water at 350 degrees C,2004, Ind. Eng. Chem. Res, 43, 2454-2463.*
Sasaki et al.,Dissolution and Hydrolysis of Cellulose in Subcritical and Supercritical Water, 2000, Ind. Eng. Chem. Res, 39, 2883-2890.*
LEDA specification Traits, downloaded online on Oct. 24, 2011, downloaded from www.leda-traitbase.org.*
He et al., Experimental Researchon direct liquefaction of woody biomass in water, 2006, Journal of Hefei University of Technology, vol. 29 No. 1.*

* cited by examiner

*Primary Examiner* — Matthew Daniels
*Assistant Examiner* — Anthony Calandra

(57) ABSTRACT

The invention herein discloses a method and its equipment for fast and complete dissolution and hydrolysis of lignocellulosic biomass. Lignocellulosic biomass is placed in a dilute alkaline solution and then rapidly heated to a temperature between 329~367° C. to achieve complete dissolution of the lignocellulosic biomass as biomass solution in 0.7~2 s. The biomass solution is further hydrolyzed rapidly to hydrolysates at homogeneous conditions. The solubilized biomass solution is easy to rapidly hydrolyze into sugars to produce bio-fuels and other value-added products, and to rapidly quench to produce micron particles in the continuous flow equipment at high pressures and high temperatures. The invention herein provides a simple and low-cost method to quickly dissolve and hydrolyze biomass with great potential for a novel biorefinery.

10 Claims, 4 Drawing Sheets

US 8,268,126 B2

METHOD, EQUIPMENT AND APPLICATIONS FOR FAST COMPLETE DISSOLUTION AND HYDROLYSIS OF LIGNOCELLULOSIC BIOMASS

CROSS REFERENCE TO RELATED APPLICATIONS

This application claims the benefit of PCT application No: PCT/CN2008/000623, Pub. No.: WO2009018709-A1, filed 2008 Mar. 28 by the present inventors; CN101235095-A filed 2007 Aug. 3 by the present inventors.

FEDERALLY SPONSORED RESEARCH

Not Applicable

SEQUENCE LISTING OR PROGRAM

Not Applicable

BACKGROUND

1. Field

The present invention is in the field of processing technologies of biomass. More particularly, the invention relates to a method and equipment for fast, complete dissolution and hydrolysis of lignocellulosic biomass, and further refining biomass to value-added products.

2. Prior Art

Typical lignocellulosic biomass, such as wood and grass plants, is composed of roughly 50% cellulose, 25% hemi-cellulose, and 20% lignin. Cellulose mainly is used for producing paper. Cellulose and hemi-cellulose also can be degraded to sugars by hydrolysis for ethanol production. The existing method of dissolving lignocellulosic biomass in hot water is inefficient and incomplete. Approximately 40~60% of woody or herbaceous biomass can be solubilized and hydrolyzed to sugars at temperatures of 200~300° C. for 15 minutes in a batch or a semi-flow percolating reactor [Mok W S L, Antal Jr M J. *Uncatalyzed solvolysis of whole biomass hemicellulose by hot compressed liquid water Ind. Eng. Chem. Res.* 1992; 31:1157-1161.]. Moreover, it often results in secondary decomposition of sugars due to long reaction time and blocking flow reactors by water-insoluble residue (e.g., char). Therefore, this process needs to be cleaned periodically and cannot be operated in a continuous flow reactor at high pressures and high temperatures.

The latest research shows that hydrothermal or hot compressed water is a weakly polar solvent with acidic and basic characteristics, and it can dissolve and hydrolyze biomass. Hydrothermal water can provide homogeneous reaction conditions for biomass hydrolysis. Sasaki et al. found that a complete dissolution of cellulose was observed at 320° C. and at high water densities (>1000 kg/m$^3$) [Sasaki m, Fang Z, Fukushima Y, Adschiri T, Arai K. *Dissolution and hydrolysis of cellulose in subcritical and supercritical water Ind. & Eng. Chem. Res.* 2000; 39(8):2883-2890.]. Later, Ogihara et al. studied the dissolution process over a wide range of water densities (550~1000 kg/m$^3$) and found that a minimum temperature of 320° C. for the complete dissolution occurred at 850 kg/m$^3$ [Ogihara Y, Smith Jr R L, Inomata H, Arai K *Direct observation of cellulose dissolution in subcritical and supercritical water over a wide range of water densities* (550~1000 kg/m3). *Cellulose.* 2005; 12:595-606.]. The above findings of complete solubilization are for pure cellulose. However, actual wood or grass plants contain about 50% cellulose, and the separating of pure cellulose is complicated and costly. It is difficult for the solubilization process of cellulose to be commercialized. Thus, it is necessary to find a method for complete dissolution of actual lignocellulosic biomass and for further refining to value-added products.

SUMMARY

The object of the invention is to overcome the drawbacks of current existing technologies and to find a low-cost, fast and convenient method for complete dissolution of biomass in a continuous process for commercial applications.

Another object of the invention is to provide equipment that can quickly and completely dissolve biomass into biomass solution and subsequently to refine the biomass solution to bio-products for industrial applications.

Through many experiments, it was found that lignocellulosic biomass can be completely solubilized rapidly by the following steps and methods. First, lignocellulosic biomass is placed in a dilute alkaline solution, subsequently hot water is added. The mixture is rapidly heated to a high temperature and high pressure to achieve the complete dissolution and fast hydrolysis of biomass. This invention is based on these findings.

DRAWINGS

Figures

DETAILED DESCRIPTION

The objects of this invention are achieved through the following techniques. Unless explained elsewhere, the percentage used here is volume-based.

The method of complete dissolution of lignocellulosic biomass comprises the steps of:

(a) Placing the lignocellulosic biomass in 1.9~10 wt % alkaline solution, and keeping biomass/liquid ratio at (0.003~1.05)/1, as sample 1;

(b) Heating pure water to a temperature between 329367° C., as sample 2;

(c) Mixing sample 1 with sample 2 from steps (a) and (b) in a reactor, keeping biomass concentration at 0.1~35.1%, adjusting pH of the mixture >11.4 and water density of 322~787 kg/m$^3$, rapidly heating the mixture to 329~367° C. (pressure of 14~106 MPa) at a heating rate of 7~16° C./s, and the lignocellulosic biomass will completely dissolve in 0.7~2 s.

The lignocellulosic biomass used in the invention includes woody biomass, such as willow and pine particles, and herbaceous biomass such as miscanthus.

The alkaline aqueous solutions are $Na_2CO_3$, HCOOK, KOH, NaOH and HCOONa solutions, but $Na_2CO_3$ solution is preferred.

The weight concentration of $Na_2CO_3$ solution used is 2.4 wt %

The above method of complete solubilization of lignocellulosic biomass can be used to produce biomass micro particles. When biomass is completely solubilized to biomass solution, the solution is rapidly cooled to room temperature at a rate of 5~10° C./s and numerous particles are obtained via precipitation.

The above method of complete solubilization of lignocellulosic biomass can also be used to produce sugars for ethanol and other bioproducts production. When biomass is completely solubilized to biomass solution, the solution is heated further to 400° C. to undergo homogeneous hydrolysis, and subsequently the mixture is cooled to room temperature. Sugars and sugar oligomers are produced that can be used for the production of ethanol and other bioproducts.

Figure 8:
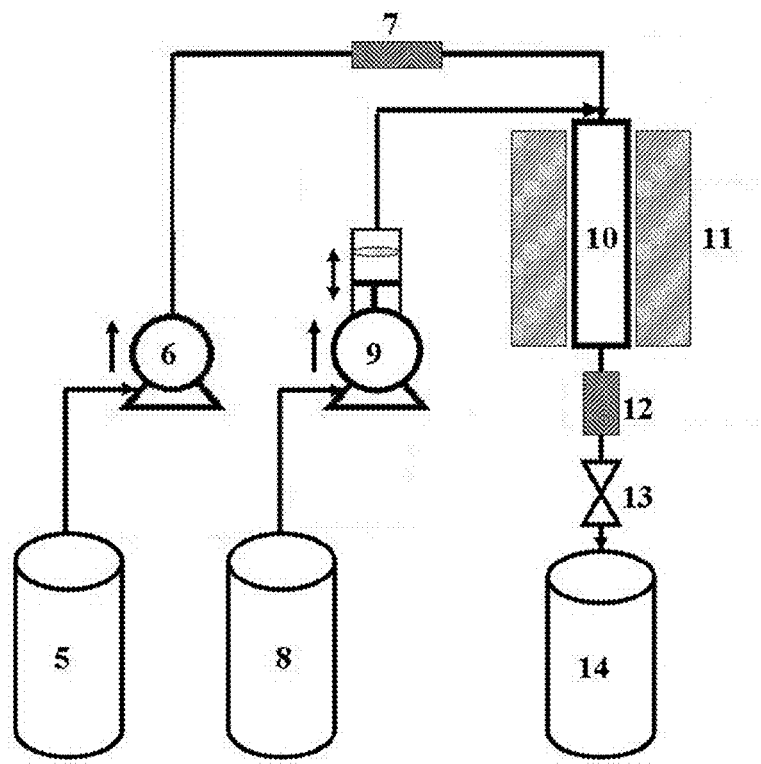
FIG. 8 is invented equipment for rapid continuous solubilization, fast hydrolysis and homogeneous refining of biomass.

The equipment (FIG. 8) for the complete dissolution of lignocellulosic biomass is comprised of the following: a pure water vessel 5 is connected to the inlet of a tubular reactor 10 through a high pressure pump 6; there is a preheater 7 between the high pressure pump 6 and the reactor 10; a biomass sample vessel 8 is connected to a pure water pipe and the reactor 10 through a high pressure slurry pump 9; a furnace 11 is used for heating the tubular reactor 10; a product vessel 14 is connected to the product outlet of the reactor 10 through a water-jacket cooler 12 and a back-pressure regulator 13.

The equipment is a tubular continuous flow reactor.

The heating devices in the equipment are electric heaters or other heaters (such as gas and oil heaters).

The advantages of the present invention include, without limitation: (a) Owing to the complete dissolution of lignocellulosic biomass in water, subsequent hydrolysis can undergo in a homogeneous phase that promotes hydrolysis and inhibits thermal decomposition; (b) fast dissolution (<0.7~2 s) and hydrolysis (<30 s) can maximize hydrolysates yield; (c) the solubilized lignocellulosic biomass, as a solution in an oil refinery, is easily and conveniently refined to sugars, fine particles, biofuels and other bio-products in a well-controlled high-pressure continuous flow reactor. The invented equipment (FIG. 8) can rapidly heat lignocellulosic biomass to dissolution temperatures (e.g., heating biomass to 400° C. in 0.02 s) by mixing preheated hot water with biomass sample to solubilize biomass immediately and to avoid biomass decomposition for subsequent homogeneous hydrolysis and reactions.

The lignocellulosic biomass used in this invention is woody or herbaceous biomass. Hardwood (18~25% lignin, 24~40% hemicellulose and 40~55% cellulose) such as willow and softwood (25~35% lignin, 25~35% hemicellulose and 45~50% cellulose) such as pine are used as sample woody biomass. Miscanthus is used as sample herbaceous biomass (10~30% lignin, 35~50% hemicellulose and 25~40% cellulose). Willow particles (22.7% lignin, 26.7% hemicellulose and 49.6% cellulose) are used as the main samples. Pine (29% lignin, 26% hemicellulose and 44% cellulose) and miscanthus (20% lignin, 21% hemi-cellulose and 43% cellulose) particles are also used as samples.

Willow, pine and miscanthus particles are used in the following non-limiting experiments to detail the invention here. However, other types of woody and herbaceous biomass can also be used in this invention as raw materials.

In order to understand the invention, experiments of the complete dissolution of willow are used to explain the invention and its potential for industrial applications.

Figure 1:
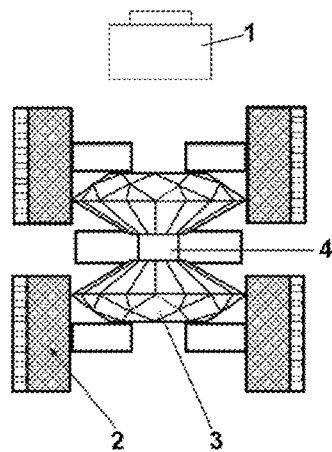
FIG. 1 is a perspective view of an optical micro-reactor Diamond Anvil Cell (DAC).

FIG. 1 shows the optical micro-reactor Diamond Anvil Cell (DAC) can rapidly heat water and biomass to high temperatures and pressures and observe biomass dissolution evolution in-situ. The reaction hole chamber 4 (50 mL; 500-µm i.d., 250-µm thickness) with samples is sealed and pressured by compression of two opposing diamond anvils 3. Mixtures of {biomass+$H_2O$/$Na_2CO_3$} are loaded into the chamber, heated rapidly by two electric micro-heaters 2 and observed under 110× magnification with a stereomicroscope 1 where the images are recorded by a 3-CCD camera and a computer. After reaction, the residues deposited on the diamond faces are analyzed by Fourier transform infrared (FT-IR) microscopy and scanning electronic microscope (SEM). Water density (=water mass/chamber volume, kg/m$^3$) is adjusted by changing the size of $N_2$ gas bubbles introduced into the chamber and determined from the homogenization temperature ($T_h$) of the gas bubbles disappearance during isochoric heating. Pressure is calculated by an equation using the water density and temperature measured from thermocouples.

Willow particles (4 mL), double-distilled water (4 mL) and 2.4-wt % aqueous $Na_2CO_3$ are prepared for experiments.

Test 1 (Dissolution of Willow in Pure Water, as a Comparison Experiment):

Set heating rate to 10° C./s and water density to 523 kg/m$^3$. Load 8 mL of willow particles and 26.2 mL pure water into the DAC chamber; The willow concentration is 30.6%.

Figure 2:
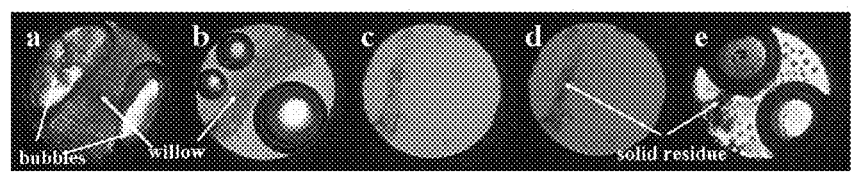
FIG. 2 is a visual observation of dissolution of a willow particle in pure water upon fast heating to 403° C.

Images evolve with time as shown in FIG. 2 upon fast heating:

a: a willow particle and gas bubbles in pure water before heating;

b: willow fibers with yellow solution and bubbles at 25.3 s and 324° C.;

c: more than 90% willow dissolves but with an insoluble solid residue at 30.5 s and 361° C.;

d: the insoluble residue becomes black due to carbonization; dissolved willow undergoes homogeneous hydrolysis along with solution color changing from yellow to red at 38.5 s and 403° C.

Figure 7:
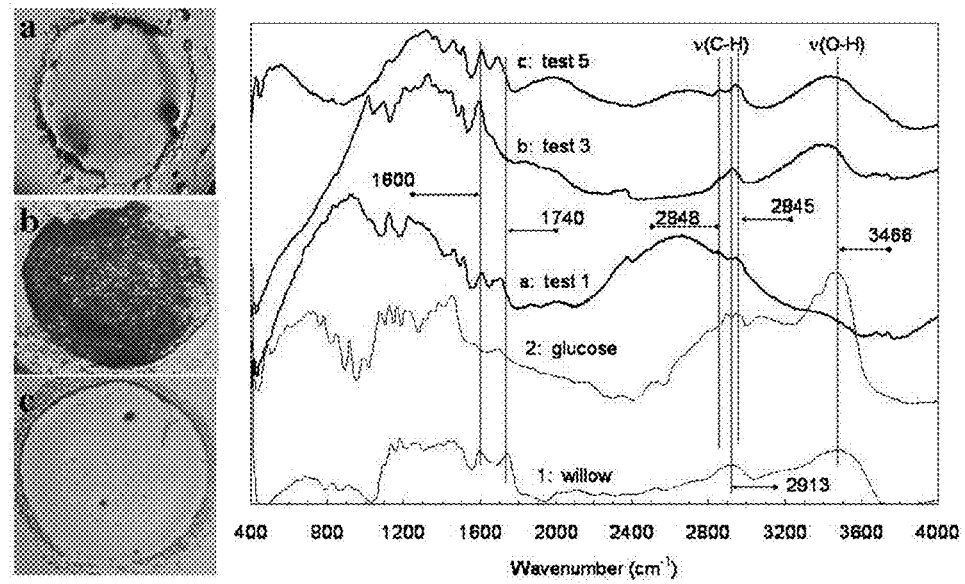
FIG. 7 is Fourier-Transform Infrared (FT-IR) spectra of the products.

After reaction, sugar-like products are produced (FIG. 2e; FIG. 7a). IR spectra shows that they are hydrolysates with glucose characters (FIG. 7; curve a vs. curves 1 & 2).

It can be concluded that fast heating {willow+water} leads to most of the willow dissolving in pure water without complete dissolution; water-insoluble solid residue still remains in the water.

Test 2 (Complete Dissolution of Willow in Dilute Alkaline Solution):

Set heating rate to 13° C./s and water density to 695 kg/m$^3$. Load 5 mL of willow particles, 11.6 mL 2.4-wt % $Na_2CO_3$ solution and 26.2 mL pure water into the chamber. After combining mixture, $Na_2CO_3$ concentration is 0.8 wt %, pH of the mixture is 11.4 and willow concentration is 14.4%.

Figure 3:
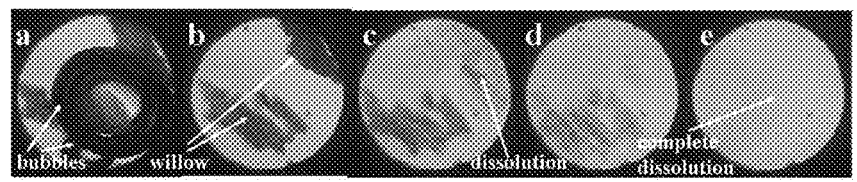
FIG. 3 is a visual observation of the complete dissolution of willow particles in dilute Na$_2$CO$_3$ aqueous solution upon fast heating to 348° C.

Images evolve with time as shown in FIG. 3 upon heating:

a: willow particles and gas bubbles in 0.8 wt % $Na_2CO_3$ aqueous solution before heating;

b: willow particles without bubbles at 18.2 s and 308° C.;

c: willow starts to dissolve at 21.2 s and 337° C.;

d: more willow dissolves at 21.6 s and 342° C.;

e: complete dissolution of willow at 22.3 s, 348° C. and 49 MPa, total dissolution time is 1.1 s (from c to e).

It can be concluded that willow can rapidly and completely dissolve in 0.8-wt % $Na_2CO_3$ solution (pH of 11.4) by fast heating.

Test 3 (Production of Micro-Particles by Rapidly Cooling of the Willow Solution):

Set heating rate to 9° C./s and water density to 787 kg/m$^3$. Load 12.5 mL of willow particles, 13.1 mL 2.4-wt % $Na_2CO_3$ solution and 26.2 mL pure water into the chamber. After combining mixture, $Na_2CO_3$ concentration is 0.8 wt %, pH of the mixture is 11.4 and willow concentration is 31.7%.

Figure 4:
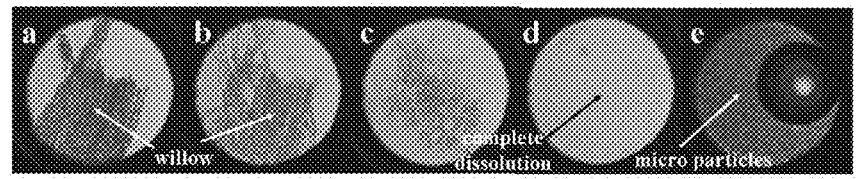
FIG. 4 is a visual observation of the complete dissolution of willow particles and numerous micro wood particles formation upon fast heating to 330° C. and subsequent cooling to room temperature in dilute Na$_2$CO$_3$ aqueous solution.

Images evolve with time as shown in FIG. 4 upon heating:

a: a willow particle just after gas bubble disappearance at 31.0 s and 258° C.;

b: the willow particle at 31.8 s and 324° C.;

c: willow starts to dissolve at 32.6 s and 326° C.;

d: complete dissolution of willow at 33.3 s, 329° C. and 98 MPa, total dissolution time is 0.7 s (from c to d).

e: numerous fine particles precipitate from the solubilized willow solution (d) by precipitation upon rapid cooling (−5° C./s).

Figure 5:
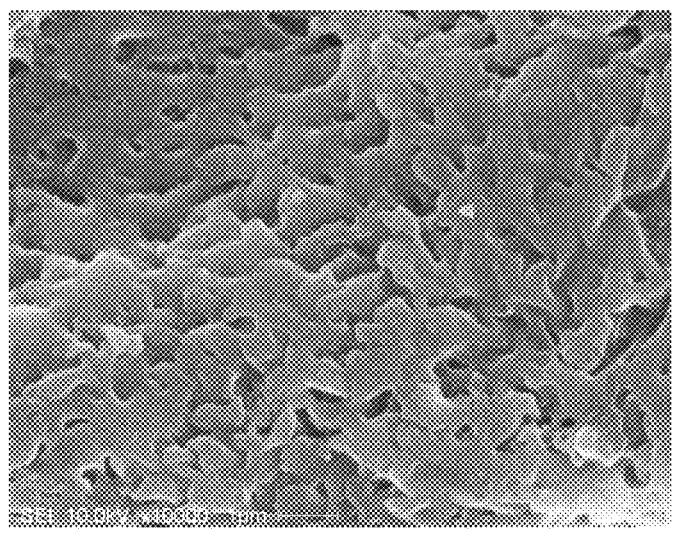
FIG. 5 is a Scanning Electronic Microscope (SEM) image of the produced wood particles via precipitation (×10,000 magnification).

In FIG. 5, SEM image shows that the fine particles produced are micro-sized (<1 micron).

In FIG. 7, IR spectra show that the micro particles (FIG. 7*b*) have similar chemical structure to willow (curve b vs. curve 1).

This test evidences that after willow completely dissolves in 0.8-wt % $Na_2CO_3$ solution, micro willow particles are obtained by precipitation upon rapidly cooling the willow solution.

Test 4 (Repetition of Test 3):

Repeating test 3: after willow completely dissolves into willow solution, micro willow particles are obtained by precipitation of the solution upon rapid cooling at a rate of −10° C./s.

Test 5 (Homogenous Complete Hydrolysis of Willow Solution to Hydrolysates in 13.6 s):

Set heating rate to 8° C./s and water density to 641 kg/m$^3$. Load 11.3 mL of willow particles, 10.7 mL 2.4-wt % $Na_2CO_3$ solution and 21.4 mL pure water into the chamber. After combining mixture, $Na_2CO_3$ concentration is 0.8 wt %, pH of the mixture is 11.4 and willow concentration is 35.1%.

Figure 6:
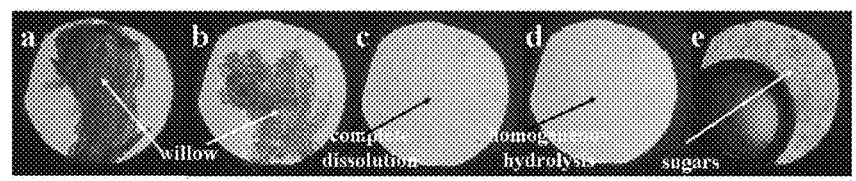
FIG. 6 is a visual observation of the complete dissolution of a willow particle and subsequent homogeneous hydrolysis of willow solution to sugar-like products in dilute Na$_2$CO$_3$ aqueous solution upon fast heating to 400° C.

Images evolve with time as shown in FIG. 6 upon heating:

a: a willow particle just after the gas bubble's disappearance at 29.6 s and 330° C.;

b: the willow particle at 32.9 s and 347° C.;

c: complete dissolution of willow at 34.4 s, 355° C. and 33 MPa, total dissolution time is 1.5 s;

d: homogenous hydrolysis of willow solution to hydrolysates upon further heating to 400° C. from 355° C. for 13.6 s at 48.0 s (from c to e);

e: all willow becomes sugar-like products (sugars and oligomers) without any solid residue after cooling to room temperature; the sugars can be fermented to ethanol or other bioproducts by bio- or chemical conversion.

FIG. 6*e* shows that willow completely homogeneously hydrolyzes to sugar-like products without solid residue produced.

In FIG. 7, IR spectra show that the sugar-like products (FIG. 7*c*) have similar chemical structure to glucose (curve c vs. curve 2).

It can be concluded that willow completely dissolves in 0.8-wt % $Na_2CO_3$ solution, and subsequently, completely and homogeneously hydrolyzes to sugar-like products upon further heating to 400° C. The sugars can be fermented to ethanol or other bioproducts by bio- or chemical conversion.

EXAMPLES

The following examples provided will serve to further illustrate the method of complete dissolution of lignocellulosic biomass: (a) placing lignocellulosic biomass in an alkaline solution with 1.9~10 wt %, from one of $Na_2CO_3$, HCOOK, KOH, NaOH, HCOONa and other alkaline solutions, keeping biomass/liquid volume ratio at about (0.003~4.05)/1, as sample 1; (b) heating pure water to temperatures ranging between 329~367° C., as sample 2; (c) mixing sample 1 with sample 2 into a reactor and keeping the mixture's biomass concentration at 0.1~35.1%, pH at above 11.4 and water density at 322~787 kg/m$^3$; and (d) heating the mixture to temperature between 329~367° C. (pressure of 14~106 MPa) at a heating rate of 7~16° C./s, the lignocellulosic biomass can be completely dissolved in 0.7~2 s.

Example 1

Figure 9:
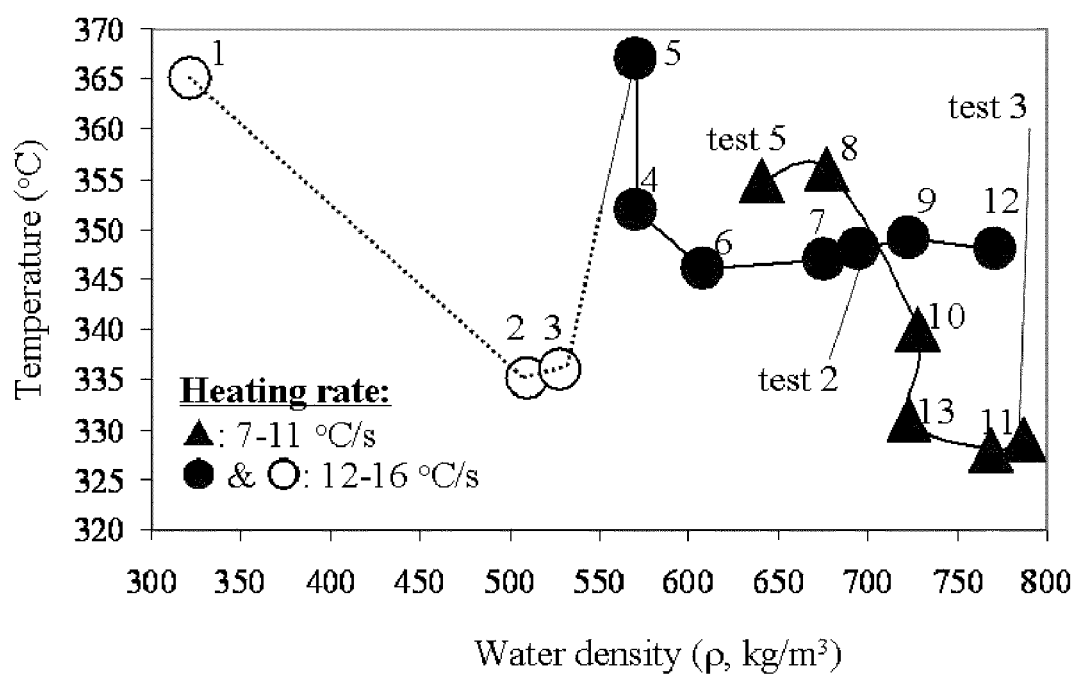
FIG. 9 shows complete dissolution temperature versus water density for tests 2, 3 & 5, and examples 1 to 13.

Willow particles are placed in 2.4 wt % $Na_2CO_3$ solution at a biomass/liquid volume ratio of 0.606/1, as sample 1. Pure water is heated to 365° C. as, sample 2. Sample 1 is mixed with sample 2 and fed into a reactor. In the mixture, $Na_2CO_3$ concentration is adjusted to 0.8 wt % (pH of 11.4), willow concentration to 20.2% and water density to 322 kg/m$^3$. The mixture is rapidly heated to 365° C. (pressure of 20 MPa) at a heating rate of 14° C./s. The willow is completely dissolved in 1.65 s. Number 1 in FIG. 9 indicates the complete dissolution temperature versus the water density in Example 1.

Example 2

The process described in Example 1 is repeated here, but with the following differences: Biomass/liquid volume ratio is 0.915/1 and pure water is heated to 335° C. After mixing, willow concentration is 30.5% and water density is 510 kg/m$^3$. The mixture is rapidly heated to 335° C. (pressure of 14 MPa) at a heating rate of 13° C./s. The willow is completely dissolved in 0.93 s. Number 2 in FIG. 9 indicates the complete dissolution temperature versus the water density in Example 2.

Example 3

The process described in Example 1 is repeated here, but with the following differences: Biomass/liquid volume ratio is 0.975/1 and pure water is heated to 336° C. After mixing, willow concentration is 32.5% and water density is 528 kg/m$^3$. The mixture is rapidly heated to 336° C. (pressure of 14 MPa) at a heating rate of 12° C./s. The willow is completely dissolved in 1.07 s. Number 3 in FIG. 9 indicates the complete dissolution temperature versus the water density in Example 3.

Example 4

The process described in Example 1 is repeated here, but with the following differences: Biomass/liquid volume ratio is 0.315/1 and pure water is heated to 352° C. After mixing, willow concentration is 10.5% and water density is 571 kg/m$^3$. The mixture is rapidly heated to 352° C. (pressure of 17 MPa) at a heating rate of 14° C./s. The willow is completely dissolved in 1.45 s. Number 4 in FIG. 9 indicates the complete dissolution temperature versus the water density in Example 4.

Example 5

The process described in Example 1 is repeated here, but with the following differences: Biomass/liquid volume ratio is 0.165/1 and pure water is heated to 367° C. After mixing, willow concentration is 5.5% and water density is 571 kg/m$^3$. The mixture is rapidly heated to 367° C. (pressure of 27 MPa) at a heating rate of 16° C./s. The willow is completely dissolved in 2 s. Number 5 in FIG. 9 indicates the complete dissolution temperature versus the water density in Example 5.

Example 6

The process described in Example 1 is repeated here, but with the following differences: Biomass/liquid volume ratio is 0.003/1 and pure water is heated to 346° C. After mixing, willow concentration is 0.1% and water density is 608 kg/m$^3$. The mixture is rapidly heated to 346° C. (pressure of 18 MPa) at a heating rate of 14° C./s. The willow is completely dissolved in 1.01 s. Number 6 in FIG. 9 indicates the complete dissolution temperature versus the water density in Example 6.

Example 7

The process described in Example 1 is repeated here, but with the following differences: Biomass/liquid volume ratio is 1.005/1 and pure water is heated to 347° C. After mixing, willow concentration is 33.5% and water density is 675 kg/m$^3$. The mixture is rapidly heated to 347° C. (pressure of 38 MPa) at a heating rate of 14° C./s. The willow is completely dissolved in 1.21 s. Number 7 in FIG. 9 indicates the complete dissolution temperature versus the water density in Example 7.

Example 8

The process described in Example 1 is repeated here, but with the following differences: Biomass/liquid volume ratio is 0.675/1 and pure water is heated to 356° C. After mixing, willow concentration is 22.5% and water density is 677 kg/m$^3$. The mixture is rapidly heated to 356° C. (pressure of 48 MPa) at a heating rate of 10° C./s. The willow is completely dissolved in 1.15 s. Number 8 in FIG. 9 indicates the complete dissolution temperature versus the water density in Example 8.

Example 9

The process described in Example 1 is repeated here, but with the following differences: Biomass/liquid volume ratio is 0.765/1 and pure water is heated to 349° C. After mixing, willow concentration is 25.5% and water density is 723 kg/m$^3$. The mixture is rapidly heated to 349° C. (pressure of 67 MPa) at a heating rate of 14° C./s. The willow is completely dissolved in 1.7 s. Number 9 in FIG. 9 indicates the complete dissolution temperature versus the water density in Example 9.

Example 10

The process described in Example 1 is repeated here, but with the following differences: Biomass/liquid volume ratio is 0.255/1 and pure water is heated to 340° C. After mixing, willow concentration is 8.5% and water density is 728 kg/m$^3$. The mixture is rapidly heated to 340° C. (pressure of 60 MPa) at a heating rate of 7° C./s. The willow is completely dissolved in 1.29 s. Number 10 in FIG. 9 indicates the complete dissolution temperature versus the water density in Example 10.

Example 11

The process described in Example 1 is repeated here, but with the following differences: Biomass/liquid volume ratio is 1.053/1 and pure water is heated to 328° C. After mixing, willow concentration is 35.1% and water density is 769 kg/m$^3$. The mixture is rapidly heated to 328° C. (pressure of 79 MPa) at a heating rate of 8° C./s. The willow is completely dissolved in 1.56 s. Number 11 in FIG. 9 indicates the complete dissolution temperature versus the water density in Example 11.

Example 12

The process described in Example 1 is repeated here, but with the following differences: Biomass/liquid volume ratio is 0.495/1 and pure water is heated to 348° C. After mixing, willow concentration is 16.5% and water density is 771 kg/m$^3$. The mixture is rapidly heated to 348° C. (pressure of 106 MPa) at a heating rate of 14° C./s. The willow is completely dissolved in 1.4 s. Number 12 in FIG. 9 indicates the complete dissolution temperature versus the water density in Example 12.

Example 13

The process described in Example 1 is repeated here, but with the following differences: Biomass/liquid volume ratio is 0.255/1 and pure water is heated to 331° C. After mixing, willow concentration is 8.5% and water density is 723 kg/m$^3$. The mixture is rapidly heated to 331° C. (pressure of 47 MPa) at a heating rate of 10° C./s. The willow is completely dissolved in 1.12 s. Number 13 in FIG. 9 indicates the complete dissolution temperature versus the water density in Example 13.

Example 14

The process described in Example 1 is repeated here, but with the following differences: Willow particles are placed in 10-wt % $Na_2CO_3$ solution at a biomass/liquid volume ratio of 0.285/1. Pure water is heated to 329° C. After mixing, $Na_2CO_3$ concentration is adjusted to 3.3 wt % (pH>11.4), willow concentration to 9.5% and water density to 787 kg/m$^3$. The mixture is rapidly heated to 329° C. (pressure of 98 MPa) at a heating rate of 9° C./s. The willow is completely dissolved in 0.7 s.

Example 15

The process described in Example 1 is repeated here, but with the following differences: Willow particles are placed in 7-wt % $Na_2CO_3$ solution at a biomass/liquid volume ratio of 0.405/1. Pure water is heated to 355° C. After mixing, $Na_2CO_3$ concentration is adjusted to 2.3 wt % (pH>11.4), willow concentration to 13.5% and water density to 641 kg/m$^3$. The mixture is rapidly heated to 355° C. (pressure of 33 MPa) at a heating rate of 8° C./. The willow is completely dissolved in 1.5 s.

Example 16

The process described in Example 1 is repeated here, but with the following differences: Willow particles are placed in 5-wt % $Na_2CO_3$ solution at a biomass/liquid volume ratio of 0.465/1. Pure water is heated to 348° C. After mixing, $Na_2CO_3$ concentration is adjusted to 1.7 wt % (pH>11.4), willow concentration to 15.5% and water density to 695 kg/m³. The mixture is rapidly heated to 348° C. (pressure of 49 MPa) at a heating rate of 13° C./s. The willow is completely dissolved in 1.1 s.

Example 17

The process described in Example 1 is repeated here, but with the following differences: Biomass sample is pine particles, pine/liquid volume ratio is 0.495/1 and pure water is heated to 360° C. After mixing, pine concentration is 16.5% and water density is 410 kg/m³. The mixture is rapidly heated to 360° C. (pressure of 19 MPa) at a heating rate of 13° C./s. The pine is completely dissolved in 1.9 s.

Example 18

The process described in Example 1 is repeated here, but with the following differences: Biomass sample is pine particles, pine/liquid volume ratio is 0.36/1 and pure water is heated to 355° C. After mixing, pine concentration is 12% and water density is 556 kg/m³. The mixture is rapidly heated to 355° C. (pressure of 18 MPa) at a heating rate of 12° C./s. The pine is completely dissolved in 0.9 s.

Example 19

The process described in Example 1 is repeated here, but with the following differences: Biomass sample is miscanthus particles, miscanthus/liquid volume ratio is 0.615/1 and pure water is heated to 345° C. After mixing, miscanthus concentration is 20.5% and water density is 723 kg/m³. The mixture is rapidly heated to 345° C. (pressure of 62 MPa) at a heating rate of 11° C./s. The miscanthus is completely dissolved in 1.5 s.

Example 20

The process described in Example 1 is repeated here, but with the following differences: Biomass sample is miscanthus particles, miscanthus/liquid volume ratio is 0.75/1 and pure water is heated to 351° C. After mixing, miscanthus concentration is 25% and water density is 453 kg/m³. The mixture is rapidly heated to 351° C. (pressure of 17 MPa) at a heating rate of 8° C./s. The miscanthus is completely dissolved in 1.7 s.

Example 21

The process described in Example 1 is repeated here, but with the following differences: The alkaline solution used is 3.8-wt % HCOOK aqueous solution. Willow/liquid volume ratio is 0.306/1 and pure water is heated to 365° C. In the mixture, pH is adjusted to 11.4, willow concentration to 10.2% and water density to 450 kg/m³. The mixture is rapidly heated to 365° C. (pressure of 20 MPa) at a heating rate of 14° C./s. The willow is completely dissolved in 1.85 s.

Example 22

The process described in Example 1 is repeated here, but with the following differences: The alkaline solution used is 2.5-wt % KOH aqueous solution. Willow/liquid volume ratio is 1.002/1 and pure water is heated to 356° C. In the mixture, pH is adjusted to 11.4, willow concentration to 33.4% and water density to 650 kg/m³. The mixture is rapidly heated to 356° C. (pressure of 37 MPa) at a heating rate of 11° C./s. The willow is completely dissolved in 1.6 s.

Example 23

The process described in Example 1 is repeated here, but with the following differences: The alkaline solution used is 3.1-wt % HCOONa aqueous solution. Willow/liquid volume ratio is 0.63/1 and pure water is heated to 340° C. In the mixture, pH is adjusted to 11.4, willow concentration to 21% and water density to 700 kg/m³. The mixture is rapidly heated to 340° C. (pressure of 43 MPa) at a heating rate of 12° C./s. The willow is completely dissolved in 1.8 s.

Example 24

The process described in Example 1 is repeated here, but with the following differences: The alkaline solution used is 1.9-wt % NaOH aqueous solution. Willow/liquid volume ratio is 0.252/1 and pure water is heated to 345° C. In the mixture, pH is adjusted to 11.4, willow concentration to 8.4% and water density to 750 kg/m³. The mixture is rapidly heated to 345° C. (pressure of 83 MPa) at a heating rate of 13° C./s. The willow is completely dissolved in 1.4 s.

Example 25

The equipment (FIG. 8) for the continuous and complete dissolution of lignocellulosic biomass comprises: a pure water vessel 5 is connected to the inlet of a tubular reactor 10 through a high pressure pump 6; there is a preheater 7 between the high pressure pump 6 and the reactor 10; a biomass sample vessel 8 is connected to a pure water pipe and the reactor 10 through a high pressure slurry pump 9; a furnace 11 is used for heating the tubular reactor 10; a product vessel 14 is connected to the product outlet of the reactor 10 through a water-jacket cooler 12 and a back-pressure regulator 13.

The operation principles of the equipment for continuous process of biomass are as follows: pure water from the water vessel 5 after being preheated to 329° C.~367° C. by the preheater 7 and is then pumped by the high pressure pump 6 into the tubular reactor 10; biomass sample with alkaline solution in the sample vessel 8 is pumped by the high pressure slurry pump 9 to the inlet of the reactor 10 where biomass is rapidly heated by the hot water and enters into the reactor 10; biomass is completely solubilized and subsequently undergoes fast homogenous hydrolysis in the reactor 10; the products are cooled by the water-jacket cooler 12 to terminate reaction and are collected in the product vessel 14; pressure is controlled by the back-pressure regulator 13.

In the continuous process equipment, it is easy to completely dissolve biomass and subsequently control the reactions of the solubilized biomass solution (e.g., reaction time, pressure, temperature, flow rate) for the following applications:

(1) Production of Micron Particles

Fine particles are obtained by quick-cooling the biomass solution immediately after biomass completely dissolves;

(2) Biomass Pretreatment

Biomass is pretreated in the homogeneous phase and its structure is broken-down when the biomass solution is heated to high temperatures or is held for long reaction times. The pretreated biomass can be further enzymatically hydrolyzed to sugars for the production of ethanol and other bio-products.

(3) Complete Hydrolysis of Biomass to Sugars and Phenolics

Biomass is completely hydrolyzed to sugars and phenolics in the homogeneous phase when the biomass solution is heated to higher temperatures or held longer reaction times. The sugars are used for ethanol production and phenolics for resin production. The sugars and phenolics are also used for the production of bio-products via bio-conversion.

(4) Continuous Production of Gas and Liquid Fuels or Chemicals

The biomass solution is catalytically refined to bio-fuels or chemicals by packing catalysts in the rear part of the reactor. The solubilized biomass enters into the rear part of the reactor where it is easily accessible to the active sites of catalysts for gasification (e.g., with Ni, Ni—Sn, $Pt/Al_2O_3$), liquefaction (e.g., with $H_2$ and $Pt/SiO_2$—$Al_2O_3$) and synthesis of chemicals (e.g. sugar alcohols with Pt/—$Al_2O_3$, 5-Hydroxymethylfurfural or Furfural without catalyst).

The invention claimed is:

1. A method for complete dissolution of lignocellulosic biomass, comprising:
   (a) placing the lignocellulosic biomass in an aqueous alkaline solution (1.9-10 wt %) and keeping biomass/liquid volume ratio at about (0.003-1.05)/1, as sample A;
   (b) heating pure water to 329-367° C., as sample B; (c) mixing sample A with B from steps (a) and (b) in a reactor and keeping the biomass concentration at 0.1-35.1%, adjusting the mixture's pH at above 11.4, keeping the pressure at 14-106 MPa (or water density at 322-787 kg/m$^3$), and heating the mixture to 329-367° C. at a heating rate of 7-16° C./s.

2. The method of claim 1 wherein said alkaline aqueous solution is selected from one of the solutions of $Na_2CO_3$, HCOOK, KOH, NaOH and HCOONa.

3. The method of claim 2 wherein said aqueous alkaline solution is $Na_2CO_3$ solution.

4. The method of claim 3 wherein the weight concentration of said $Na_2CO_3$ aqueous solution is 2.4 wt %.

5. The method of claim 1 wherein said lignocellulosic biomass includes woody and grassy plants.

6. The method of claim 1 wherein pure water is pumped from a pure water vessel by a high pressure pump to a reactor vessel wherein a preheater is located between the high pressure pump and the reactor vessel;
   the lignocellulosic biomass is transferred from a biomass sample vessel to the reactor by a high pressure slurry pump, wherein the biomass sample vessel is connected to a pure water pipe;
   wherein the reactor vessel is heated by a furnace; wherein the vessel has an outlet through a water jacket cooler and a back pressure regulator connected to a product vessel.

7. The method of claim 6 wherein said reactor is a tubular continuous flow reactor.

8. The method of claim 6 wherein said preheater and said furnace are selected from the group consisting of electric heaters, gas heaters, oil heaters and combinations thereof.

9. The method of claim 1 wherein lignocellulosic biomass solutions are produced.

10. The method of claim 9 wherein said lignocellulosic biomass solutions are used for biomass pretreatment, fast hydrolysis to hydrolysates, the production of micron particles, hydrolysates for ethanol, bio-materials, gas and liquid fuels, chemicals and food.

* * * * *